US009990851B2

(12) United States Patent
Naka et al.

(10) Patent No.: US 9,990,851 B2
(45) Date of Patent: Jun. 5, 2018

(54) OBSTACLE-INFORMATION-MANAGING DEVICE

(71) Applicant: Hitachi Automotive Systems, Ltd., Hitachinaka-shi, Ibaraki (JP)

(72) Inventors: Takuya Naka, Tokyo (JP); Hiroki Uchiyama, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/306,863

(22) PCT Filed: Jun. 1, 2015

(86) PCT No.: PCT/JP2015/065714
§ 371 (c)(1),
(2) Date: Oct. 26, 2016

(87) PCT Pub. No.: WO2015/186647
PCT Pub. Date: Dec. 10, 2015

(65) Prior Publication Data
US 2017/0046958 A1 Feb. 16, 2017

(30) Foreign Application Priority Data
Jun. 6, 2014 (JP) .................................. 2014-117509

(51) Int. Cl.
*G08G 1/16* (2006.01)
*B60W 50/14* (2012.01)
(Continued)

(52) U.S. Cl.
CPC ............. *G08G 1/16* (2013.01); *G08G 1/0112* (2013.01); *G08G 1/0125* (2013.01);
(Continued)

(58) Field of Classification Search
CPC .......... G08G 1/00; G08G 1/16; G08G 1/0112; G08G 1/0125; G08G 1/09; B60W 50/00;
(Continued)

(56) References Cited

U.S. PATENT DOCUMENTS

2007/0200747 A1* 8/2007 Okai ....................... G01S 7/023
342/70
2010/0002078 A1* 1/2010 Ito ............................ B60R 1/00
348/135
(Continued)

FOREIGN PATENT DOCUMENTS

EP 2 463 678 A1 6/2012
JP 2006-172053 A 6/2006
(Continued)

OTHER PUBLICATIONS

International Search Report (PCT/ISA/210) issued in PCT Application No. PCT/JP2015/065714 dated Sep. 1, 2016 with English translation (5 pages).
(Continued)

*Primary Examiner* — Yonel Beaulieu
(74) *Attorney, Agent, or Firm* — Crowell & Moring LLP

(57) ABSTRACT

An obstacle-information-managing device determines, with high precision, the presence of an obstacle around a vehicle. The obstacle-information-managing device includes an obstacle-information-acquiring unit, an obstacle-detection-possibility-information-acquiring unit, and an obstacle-presence-determining unit. The obstacle-information-acquiring unit acquires obstacle information pertaining to an obstacle around each of a plurality of vehicles including a host vehicle, the obstacle being detected using environment sensors mounted on the vehicles. The obstacle-detection-possibility-information-acquiring unit acquires obstacle detection possibility information pertaining to the possibility, when at least one obstacle is detected using the environment sensor(s) mounted on at least one of the vehicles and at least one obstacle is not detected using the environ-
(Continued)

ment sensor(s) mounted on the remaining vehicle(s), of at least one of the obstacles being detected using the environment sensor(s) mounted on the remaining vehicle(s). The obstacle-presence-determining unit determines the presence of at least one obstacle based on the obstacle-detection-possibility information and the obstacle information.

8 Claims, 16 Drawing Sheets

(51) Int. Cl.
    *B60W 30/16*     (2012.01)
    *G01S 13/04*     (2006.01)
    *G08G 1/09*     (2006.01)
    *G08G 1/01*     (2006.01)
    *G08G 1/0967*     (2006.01)
    *B60R 21/0134*     (2006.01)

(52) U.S. Cl.
    CPC ............ *G08G 1/0133* (2013.01); *G08G 1/09* (2013.01); *G08G 1/096716* (2013.01); *G08G 1/096758* (2013.01); *G08G 1/096791* (2013.01); *B60R 21/0134* (2013.01)

(58) Field of Classification Search
    CPC ...... B60W 50/14; B60W 30/00; B60W 30/16; B60R 1/00; B60R 1/12; B60R 11/04; G01S 13/00; G01S 13/04; G01S 13/931
    See application file for complete search history.

(56) References Cited

U.S. PATENT DOCUMENTS

| | | | |
|---|---|---|---|
| 2010/0198513 A1 | 8/2010 | Zeng et al. | |
| 2010/0214085 A1 | 8/2010 | Avery et al. | |
| 2010/0315217 A1* | 12/2010 | Miura | B60W 30/18009 340/436 |
| 2011/0175752 A1* | 7/2011 | Augst | B60R 1/00 340/905 |
| 2012/0059789 A1* | 3/2012 | Sakai | G08G 1/161 706/52 |
| 2012/0101704 A1 | 4/2012 | Wagner | |
| 2013/0181823 A1* | 7/2013 | Stahlin | B60K 35/00 340/436 |
| 2014/0129073 A1* | 5/2014 | Ferguson | G05D 1/00 701/23 |
| 2015/0015714 A1* | 1/2015 | Gokan | G08G 1/166 348/148 |
| 2015/0057834 A1* | 2/2015 | Morimoto | B62D 15/029 701/1 |
| 2015/0177007 A1* | 6/2015 | Su | G01C 21/34 701/25 |

FOREIGN PATENT DOCUMENTS

| | | |
|---|---|---|
| JP | 2006-318093 A | 11/2006 |
| JP | 2008-293099 A | 12/2008 |
| JP | 2009-187413 A | 8/2009 |
| JP | 2013-159120 A | 8/2013 |

OTHER PUBLICATIONS

Japanese-language Written Opinion (PCT/ISA/237) issued in PCT Application No. PCT/JP2015/065714 dated Sep. 1, 2016 (5 pages).
Partial Supplementary European Search Report issued in counterpart European Application No. 15802700.3 dated Mar. 14, 2018 (20 pages).

* cited by examiner

FIG. 10

| OBSTACLE | PEDESTRIAN 100 | PEDESTRIAN 101 | OBSTACLE 110 | FEATURE 120 | VEHICLE 201 |
|---|---|---|---|---|---|
| VEHICLE 200 | DETECTED | NOT-DETECTED | DETECTED | NOT-DETECTED | NOT-DETECTED |
| VEHICLE 201 | DETECTED | DETECTED | NOT-DETECTED | DETECTED | NOT-DETECTED |
| VEHICLE 202 | NOT-DETECTED | NOT-DETECTED | NOT-DETECTED | DETECTED | DETECTED |
| VEHICLE 203 | DETECTED | NOT-DETECTED | NOT-DETECTED | NOT-DETECTED | NOT-DETECTED |

FIG. 12

| OBSTACLE | PEDESTRIAN 100 | PEDESTRIAN 101 | OBSTACLE 110 | FEATURE 120 | VEHICLE 201 |
|---|---|---|---|---|---|
| VEHICLE 200 | EXCLUDED FROM DETERMINATION OBJECT | DETECTION IS IMPOSSIBLE | EXCLUDED FROM DETERMINATION OBJECT | EXCLUDED FROM DETERMINATION OBJECT | EXCLUDED FROM DETERMINATION OBJECT |
| VEHICLE 201 | EXCLUDED FROM DETERMINATION OBJECT | EXCLUDED FROM DETERMINATION OBJECT | DETECTION IS POSSIBLE | | |
| VEHICLE 202 | DETECTION IS IMPOSSIBLE | DETECTION IS IMPOSSIBLE | DETECTION IS POSSIBLE | | |
| VEHICLE 203 | EXCLUDED FROM DETERMINATION OBJECT | DETECTION IS IMPOSSIBLE | DETECTION IS IMPOSSIBLE | | |

FIG. 13

| OBSTACLE | PEDESTRIAN 100 | PEDESTRIAN 101 | OBSTACLE 110 | FEATURE 120 | VEHICLE 201 |
|---|---|---|---|---|---|
| VEHICLE 200 | ○ (DETECTED) | | ○ (DETECTED) | | |
| VEHICLE 201 | ○ (DETECTED) | ○ (DETECTED) | × (NOT-DETECTED) | ○ (DETECTED) | |
| VEHICLE 202 | | | × (NOT-DETECTED) | ○ (DETECTED) | ○ (DETECTED) |
| VEHICLE 203 | ○ (DETECTED) | | | | |
| PRESENCE OR ABSENCE OF OBSTACLE | ○ (PRESENT) | ○ (PRESENT) | × (ABSENT) | ○ (PRESENT) | ○ (PRESENT) |
| DEGREE OF ACCURACY | 1 (=3/3) | N/A | 2/3 | 1 | 1 |

OBSTACLE-INFORMATION-MANAGING DEVICE

TECHNICAL FIELD

The present invention relates to an obstacle-information-managing device that determines the presence of a peripheral obstacle.

BACKGROUND ART

According to a moving object detecting device for a vehicle as described in PTL 1, the presence of a pedestrian and the like in a monitoring region of a host vehicle is detected in a region that is blocked by a parked vehicle, a building, and the like in front of the host vehicle, an intersection with low visibility in front of the host vehicle, and the like on the basis of information that is obtained by a rear monitoring unit for a front vehicle that is located in front of the host vehicle.

CITATION LIST

Patent Literature

PTL 1: Japanese Unexamined Patent Application Publication No. 2006-318093

SUMMARY OF INVENTION

Technical Problem

However, in the moving object detecting device for a vehicle as described in PTL 1, there is a concern that an error may be included in the information obtained by the rear monitoring unit for the front vehicle.

Solution to Problem

An obstacle-information-managing device includes: an obstacle information acquiring unit that acquires obstacle information pertaining to an obstacle, which is detected by an external sensor mounted in each of a plurality of vehicles including a host vehicle, at the periphery of the vehicle; an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles; and an obstacle presence determining unit that determines the presence of the at least one obstacle based on the obstacle detection possibility information and the obstacle information.

Advantageous Effects of Invention

According to the invention, it is possible to determine the presence of an obstacle with high accuracy.

BRIEF DESCRIPTION OF DRAWINGS

FIG. 10 is a diagram illustrating an example of an obstacle detection result list with external sensors which are mounted in respective vehicles.

FIG. 12 is a diagram illustrating an example of an obstacle detection possibility determination result list.

FIG. 13 is a diagram, illustrating a list of an obstacle presence determining process result, and a calculation result of a degree of accuracy which are obtained by an obstacle presence determining unit.

DESCRIPTION OF EMBODIMENTS

Figure 1:
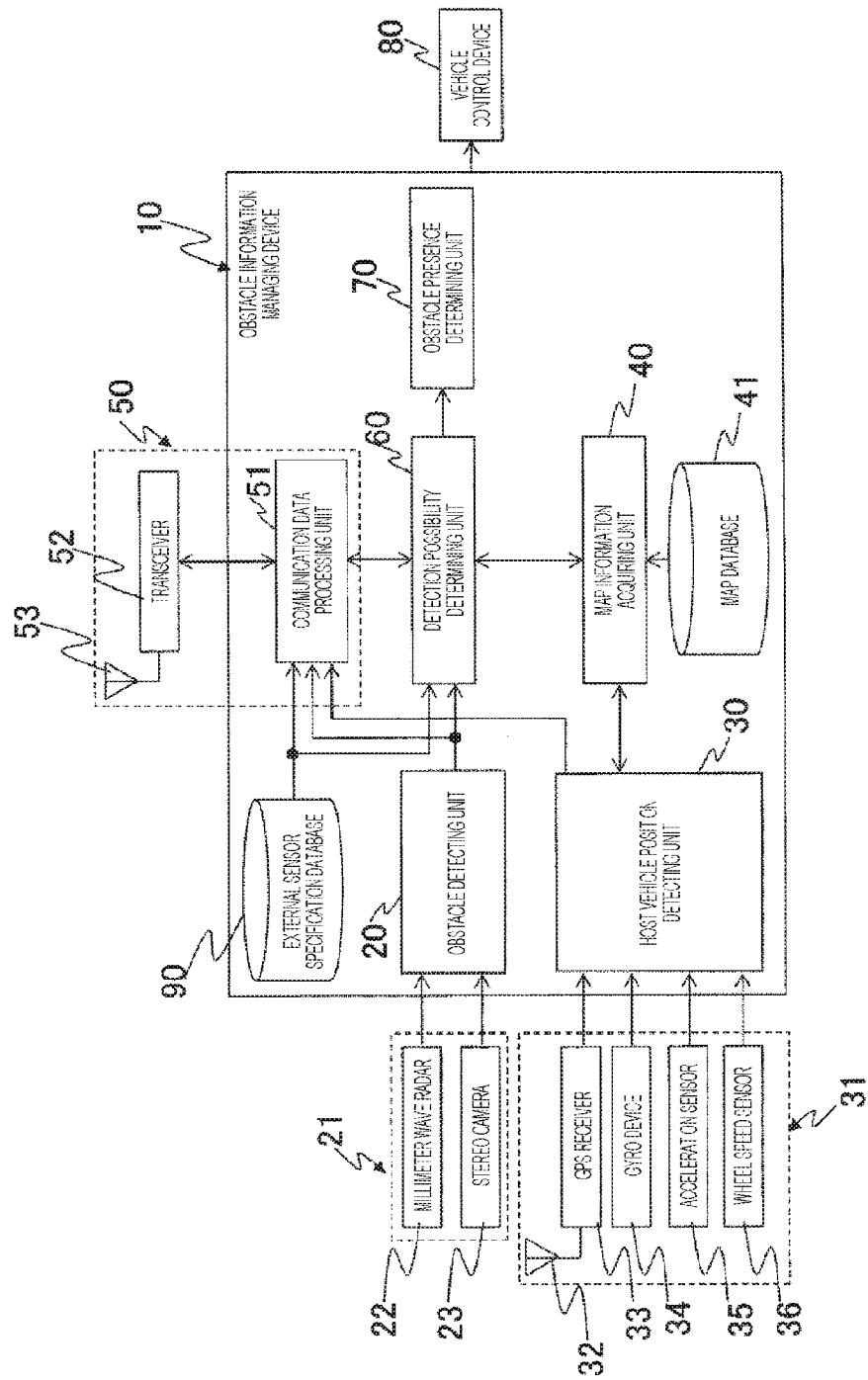
FIG. 1 is a configuration diagram of an obstacle-information-managing device.

FIG. 1 illustrates a configuration of an obstacle-information-managing device 10 according to a first embodiment of the invention. Respective constituent elements of the obstacle-information-managing device 10 will be described with reference to a flowchart in FIG. 3 and specific examples in FIG. 4 to FIG. 13. First, the overview of the constituent elements of the obstacle-information-managing device 10 will be described. The obstacle-information-managing device 10 includes a CPU and a memory. The CPU executes a computer program that is stored in the memory, and thus the obstacle-information-managing device 10 functionally has the following constituent elements.

An obstacle detecting unit 20 grasps an obstacle which is present at the periphery of a vehicle based on information obtained from an external sensor 21, which is mounted in the vehicle, such as a millimeter wave radar 22 and a stereo camera 23 which detect a relative position and a relative speed of the obstacle with respective to the vehicle, a size or a kind of the obstacle, and the like. The kind of the external sensor 21 that is mounted in the vehicle may be other sensors such as a laser radar and a monocular camera without limitation to the millimeter wave radar 22 and the stereo camera 23. In addition, the obstacle detecting unit 20 may have a function of monitoring an operation state as to whether or not the external sensor 21 normally operates. For example, in a case where information, which is periodically transmitted from the external sensor 21, is interrupted for a predetermined period, the obstacle detecting unit 20 may determine that abnormality occurs in the external sensor 21.

Figure 2:
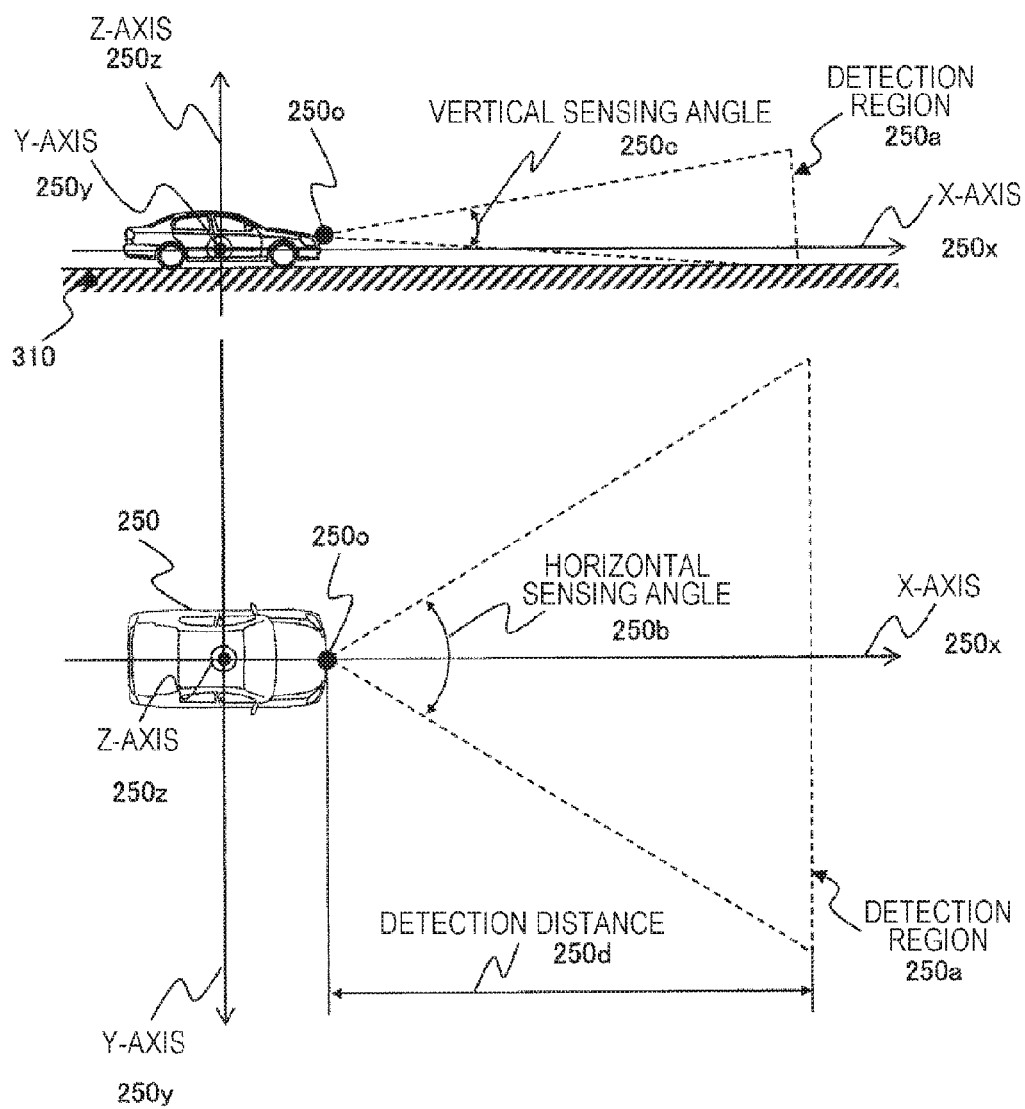
FIG. 2 is a relationship diagram of a vehicle coordinate system, and an installation location and a posture of an external sensor.

An external sensor specification database 90 stores specification information pertaining to the external sensor 21, for example, the kind (a camera, a radar, and the like), an installation position, an installation direction, a detection range capable of detecting an obstacle, and the like of the external sensor 21 that is mounted in the vehicle. For example, as illustrated in FIG. 2, a vehicle coordinate system is defined as follows. The central position of a vehicle 250 or the like is set as the origin. The vehicle coordinate system includes an X-axis 250x in which a vehicle travel direction is set as a positive side, a Y-axis 250y in which a vehicle-width right direction with respect to the vehicle travel direction is set as a positive side, and a Z-axis 250z in which a vertically upward side with respect to a travel road surface 310 is set as a positive side. The installation position and the installation direction of the external sensor 21 are set with a relative position of an installation position 250o of the external sensor and a relative angle of a sensor posture direction with respect to the vehicle coordinate system. In addition, as illustrated in FIG. 2, a detection range 250a of the external sensor is set with a sensing angle 250b in a horizontal direction, a detection angle 250c in a vertical direction, and a detection distance 250d.

A host vehicle position detecting unit 30 in FIG. 1 estimates a travel position or a posture of the vehicle based on information obtained from the internal sensor 31 such as an antenna 32 and a receiver 33 which receive a positional measurement signal transmitted from a global positioning system (GPS) satellite, a gyro sensor 34, an acceleration sensor 35, and a wheel speed sensor 36. For example, the position is expressed by a latitude and a longitude, and the posture is expressed by a rolling angle, a pitch angle, and a yaw angle. The host vehicle position detecting unit 30 may estimate the travel position or the posture of the vehicle by using a land mark that is detected by a magnetic compass or the external sensor 21.

Map information including road network information, road shape information, and feature information is stored in a map database 41. The road network information is information representing a road-to-road connection state of the travel road. The road shape information is stored in correlation with the road network information, and represents a road shape such as a road width, a lane width, the number of lanes, a longitudinal slope, and a curvature of the travel road. The feature information is stored in correlation with the road network information and the road shape information, and represents an arrangement, a height, a size, and the like of a feature (object) such as a guardrail, a wall, an electric pole, a sign, a row of trees, a building, and the like which are installed on the road or at the periphery of the road.

A map information acquiring unit 40 acquires map information at the periphery of the travel position, which is detected by the host vehicle position detecting unit 30, from the map database 41. Furthermore, the map information acquiring unit 40 acquires map information in a range including a position of an obstacle, which is detected by other vehicles and is obtained by a communication unit 50, based on an instruction of a detection possibility determining unit 60 to be described later.

When information such as obstacle information and an obstacle detection possibility determination result, which are transmitted to other vehicles, is set, a communication data processing unit 51 performs a transmission process in accordance with a communication protocol, and notifies the other vehicles of transmission information with a wireless communication through a transceiver 52 and an antenna 53 at appropriate timing. In addition, the communication data processing unit 51 receives information such as obstacle information and an obstacle detection possibility determination result, which are transmitted from the other vehicles, through the antenna 53 and the transceiver 52. The communication data processing unit 51 decodes the received information in accordance with a communication protocol. For example, in a case where the received information is the obstacle detection possibility determination result, the communication data processing unit 51 notifies the received information of a detection possibility determining unit 60 and the like. In this embodiment, the communication data processing unit 51 transmits obstacle information such as a relative position, a relative speed, and a size of an obstacle detected by the obstacle detecting unit 20, information pertaining to a position or a posture of the host vehicle which is estimated by the host vehicle position detecting unit 30, specification information, which is stored in the external sensor specification database 90, of the external sensor 21 that is mounted in the host vehicle to vehicles at the periphery of the host vehicle at a constant cycle. The communication data processing unit 51 also receives the same kind of information that is transmitted from the other vehicles. The communication data processing unit 51, the transceiver 52, and the antenna constitute the communication unit 50 for a wireless communication of information between vehicles.

The detection possibility determining unit 60 confirms detection results of the entirety of obstacles by the host vehicle and respective vehicles at the periphery of the host vehicle. With respect to a result indicating that an obstacle detected by an external sensor mounted in an arbitrary vehicle cannot be detected by an external sensor mounted in another vehicle, the detection possibility determining unit 60 makes a determination on whether or not the obstacle can be detected in principle from a positional relationship between the vehicle and the obstacle and geographical conditions (obstacle detection possibility determination). The detection possibility determining unit 60 performs the obstacle detection possibility determination based on map information obtained from the map information acquiring unit 40, position information and posture information of the host vehicle which are obtained from the host vehicle position detecting unit 30, specification information of the external sensor which is obtained from the external sensor specification database 90, obstacle detection information that is obtained from the obstacle detecting unit 20, and obstacle information that is obtained from the communication data processing unit 51 and is transmitted from other vehicles. In a case where it is determined that an obstacle is present in the detection range of the external sensor and it is determined that the obstacle is not in a state of being hidden by a feature and the like, the detection possibility determining unit 60 makes a determination as "detection as possible" based on the specifications of the external sensor. In a case where it is determined that the obstacle is not present in the detection range of the external sensor, or it is determined that the obstacle is hidden by a feature and the like, the detection possibility determining unit 60 makes a determination as "detection is impossible".

Furthermore, in this embodiment, the detection possibility determination is performed based on the specifications of the external sensor and the map information, a detection performance of the external sensor with respect to a sunshine situation or an atmospheric situation may be added to determination conditions. For example, in a case where a vehicle travels on a road in which fog occurs, the detection possibility determining unit 60 acquires a foggy region from atmospheric information obtained by the communication unit. It is considered that detection of the obstacle in the foggy region with the external sensor such as a camera is impossible in principle, and thus the detection possibility determining unit 60 determines the obstacle as "detection is impossible".

In this embodiment, detection possibility of an obstacle, which is not detected by other vehicles, is determined by the detection possibility determining unit 60 of the host vehicle different from the other vehicles. In addition, the other vehicles which do not detect the obstacle, the detection possibility determining unit 60 mounted in the other vehicles may determine whether or not the obstacle can be detected in principle. The communication data processing unit 51 of the other vehicles notifies the host vehicle of an obstacle detection possibility determination result, and the detection possibility determining unit 60 of the host vehicle acquires the obstacle detection possibility determination result transmitted from the other vehicles. The detection possibility determining unit 60 of the host vehicle transmits the acquired obstacle detection possibility determination result to an obstacle presence determining unit 70. In contrast, in a case where it is determined that an obstacle, which is not detected by the external sensor 21 mounted in the host vehicle, is present based on obstacle information that is received by the communication data processing unit 51 of the host vehicle and is transmitted from the other vehicles, the detection possibility determining unit 60 of the host vehicle may determine whether or not the obstacle can be detected in principle, and notify the other vehicles of the obstacle detection possibility determination result by using the communication data processing unit 51 of the host vehicle.

The obstacle presence determining unit 70 determines the presence of an obstacle, which is detected by the external sensor 21 mounted in the host vehicle and the external sensor 21 mounted in the other vehicles, at the periphery of the host vehicle based on majority decision in consideration of the obstacle detection possibility determination result of the detection possibility determining unit 60. As described above, with respect to the non-detection result indicating that the obstacle detected by the external sensor 21 mounted in the other vehicles is not detected by the external sensor 21 mounted in the host vehicle, the detection possibility determining unit 60 makes a determination on whether or not the external sensor 21 mounted in the host vehicle can detect the obstacle in principle. The non-detection result of the obstacle, which is determined by the detection possibility determining unit 60 as "detection possible" is included in a majority decision process. The reason for this is as follows. There is a high possibility that an obstacle to be originally detected is not detected due to an erroneous detection operation of the external sensor 21 mounted in the host vehicle. On the other hand, the non-detection result of the obstacle, which is determined as "detection is impossible" is not included in the majority decision process. The reason for this is as follows. There is a high possibility that there is a situation in which the obstacle cannot be detected in principle with the external sensor. As described above, the non-detection result corresponding to a situation in which the obstacle cannot be detected in principle is not included in the majority decision process, and thus it is possible to prevent an originally present obstacle from being excluded from the majority decision.

The obstacle presence determining unit 70 calculates a ratio of the number of detected obstacles used for the majority decision determination or a ratio of the number of not-detected obstacles used for the majority decision determination as a degree of accuracy. In a case where obstacle information is effective, a detection ratio of the obstacle is set as the degree of accuracy, and in a case where the obstacle information is ineffective, the non-detection ratio of the obstacle is set as the degree of accuracy. Furthermore, in a case where only two or less detection results are present, that is, the number of parameters in majority decision is 2 or less, the obstacle presence determining unit 70 retains the obstacle information, and sets a value "N/A" indicating that a majority decision process is not established as the degree of accuracy. The degree of accuracy can be used by a vehicle control device 80 for setting of an alarm level for a driver, adjustment of a control gain pertaining to a deceleration operation, and the like. For example, when receiving an obstacle presence determination result indicating "obstacle is present" with a high degree of accuracy from the obstacle presence determining unit 70, and a calculation result of the degree of accuracy, the vehicle control device 80 may set the control gain to a high side so as to enhance an operation response of a brake actuator with respect to a deceleration command. When receiving an obstacle presence determining process result indicating "obstacle is present" with a low degree of accuracy, and a calculation result of the degree of accuracy from the obstacle presence determining unit 70, the vehicle control device 80 may retard alarm output timing to a driver, or may suppress the alarm output.

As described above, the vehicle control device 80 executes a process of outputting an alarm to a driver or a process of performing a deceleration operation based on the obstacle presence determining process result determined by the obstacle presence determining unit 70. That is, the vehicle control device 80 performs a vehicle control of the host vehicle to support driving.

Figure 3:
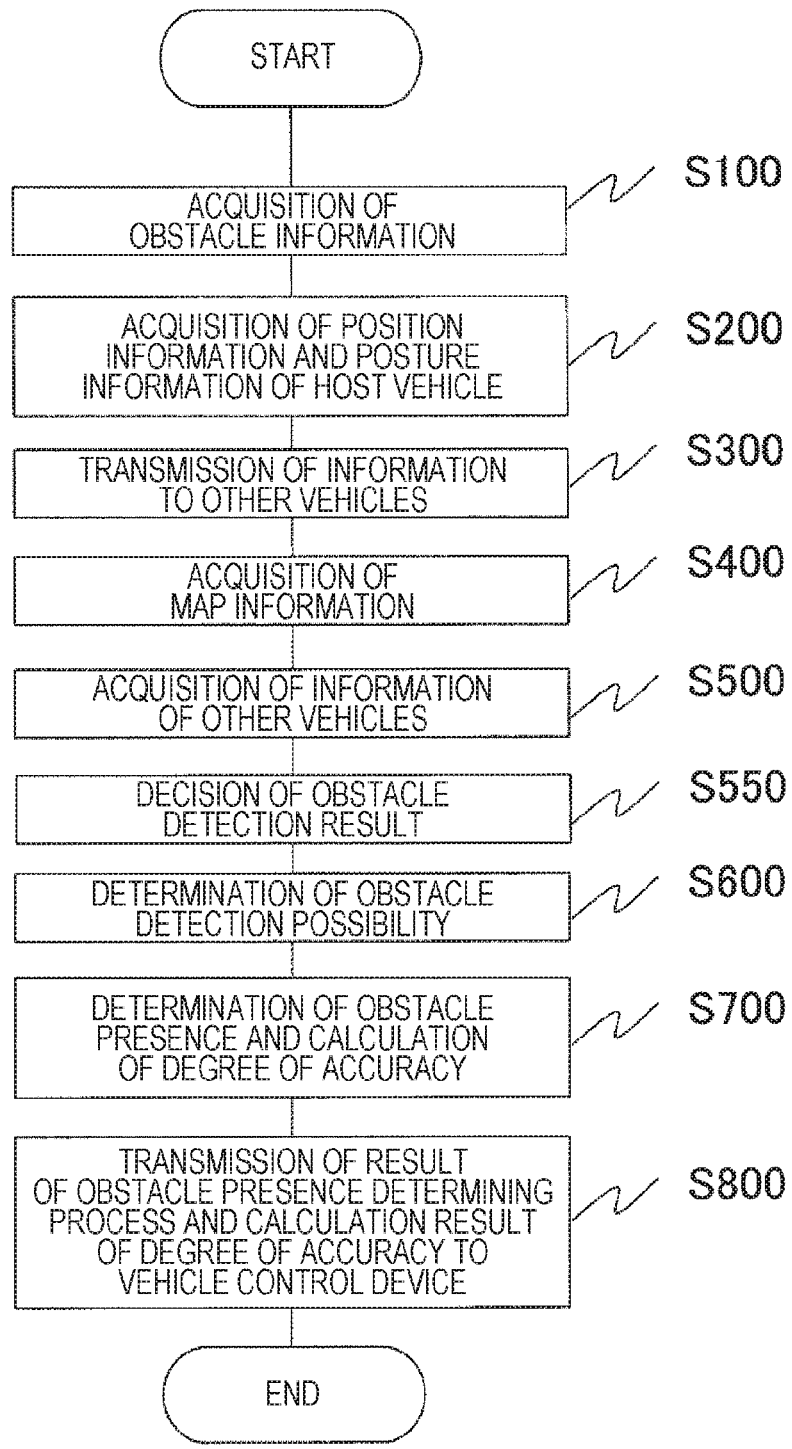
FIG. 3 is a flowchart of obstacle information processing that is performed in the obstacle-information-managing device.

Hereinafter, description will be given of functions of respective constituent elements with reference to FIG. 3 to FIG. 13. FIG. 3 is a flowchart of a process of acquiring obstacle information, determining presence of the obstacle, and calculating the degree of accuracy by the constituent elements included in the obstacle-information-managing device 10. A process flow will be described with reference to a travel scene illustrated in FIG. 4.

Figure 4:
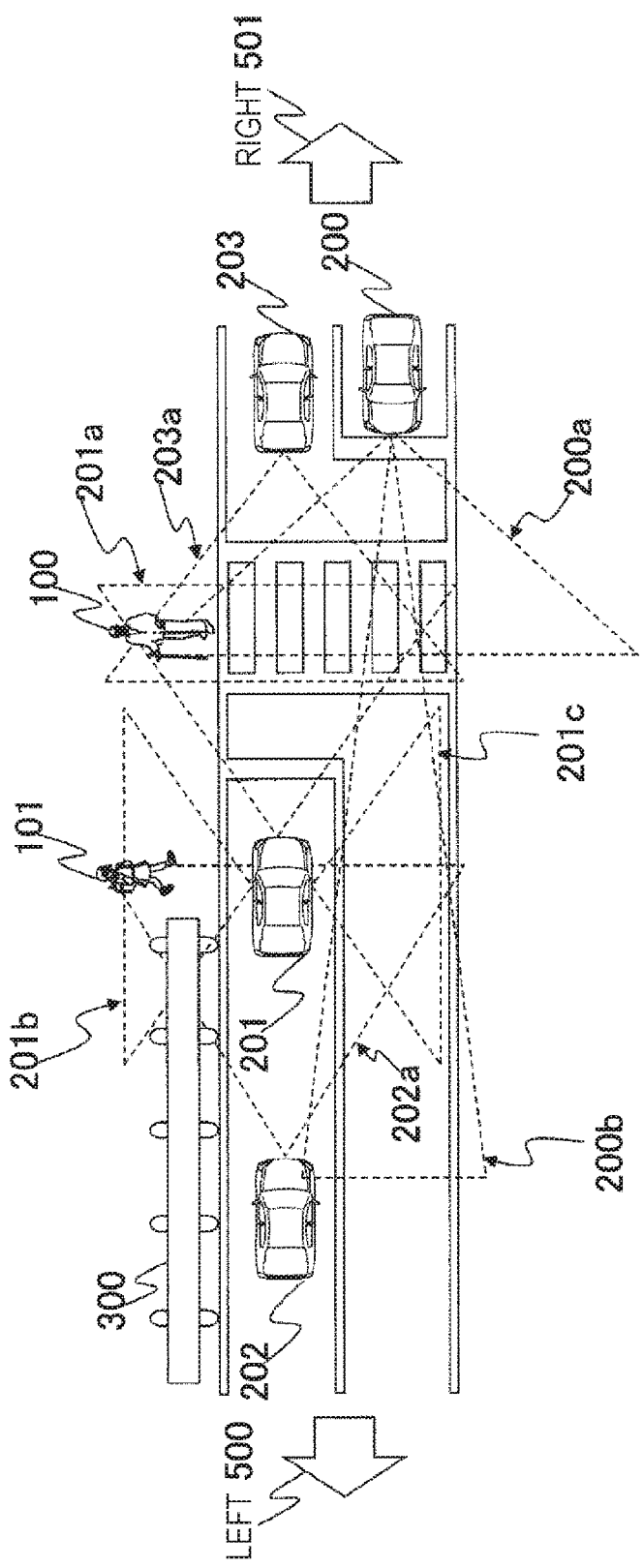
FIG. 4 is a diagram illustrating a vehicle travel scene that is used to illustrate the obstacle information processing that is performed in the obstacle-information-managing device.

FIG. 4 illustrates a scene in which four vehicles 200, 201, 202, and 203 in which the obstacle-information-managing device 10 is mounted travel on a one-lane road in each direction, and two pedestrians 100 and 101 walk along a sidewalk in which a guardrail 300 is installed. Furthermore, it is assumed that the vehicles 201, 202, and 203 travel toward a right side 501 in the drawing, and the vehicle 200 travel toward a left side 500. In addition, it is assumed that the external sensor is mounted in each of the vehicles, two external sensors corresponding to detection regions 200a and 200b are mounted in the vehicle 200, three external sensors corresponding to detection regions 201a, 201h, and 201c are mounted in the vehicle 201, one external sensor corresponding to a detection region 202a is mounted in the vehicle 202, and one external sensor corresponding to a detection region 203a is mounted in the vehicle 203.

Hereinafter, description will be sequentially given of process contents illustrated in a flowchart of FIG. 3. Furthermore, in this flowchart, an obstacle information processing sequence of the obstacle-information-managing device 10 is common to the entirety of vehicles, and thus description will be made without limitation to a fixed vehicle unless otherwise stated.

Figure 5:
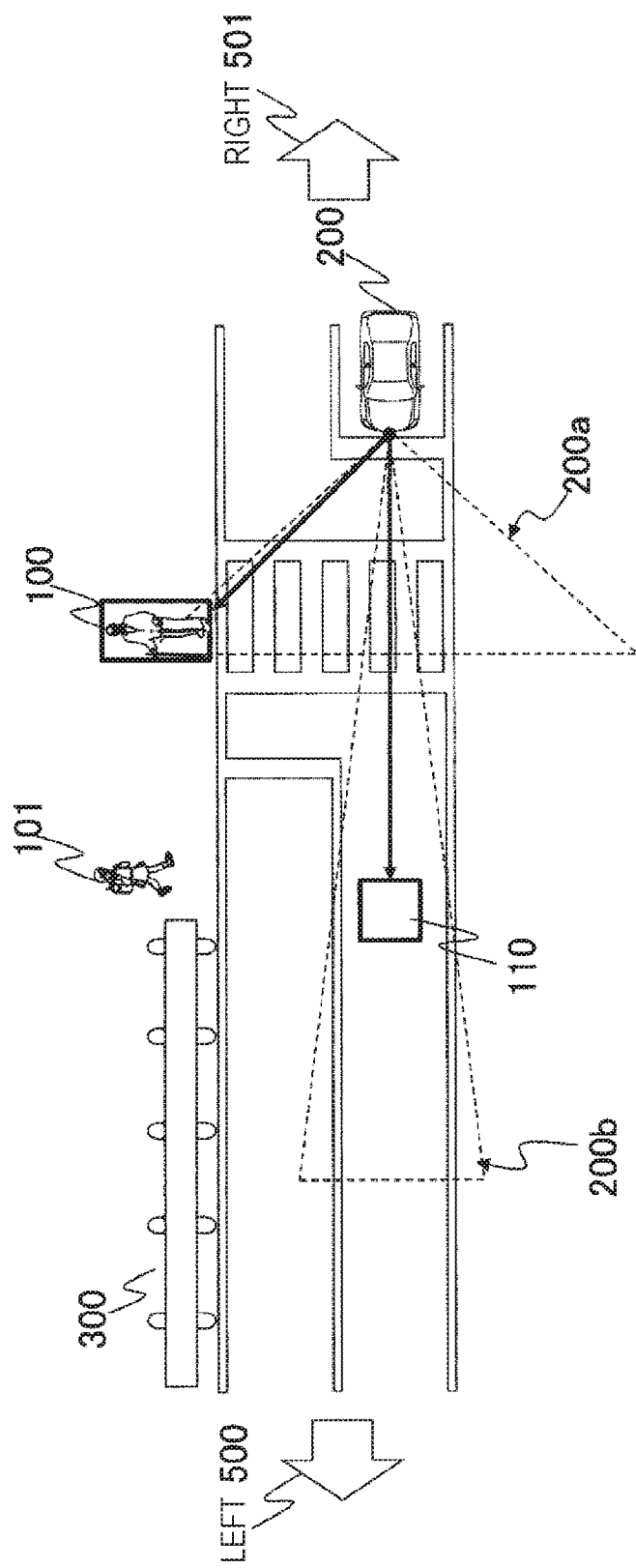
FIG. 5 is a diagram illustrating an example of an obstacle detection situation with a vehicle-mounted external sensor.
Figure 6:
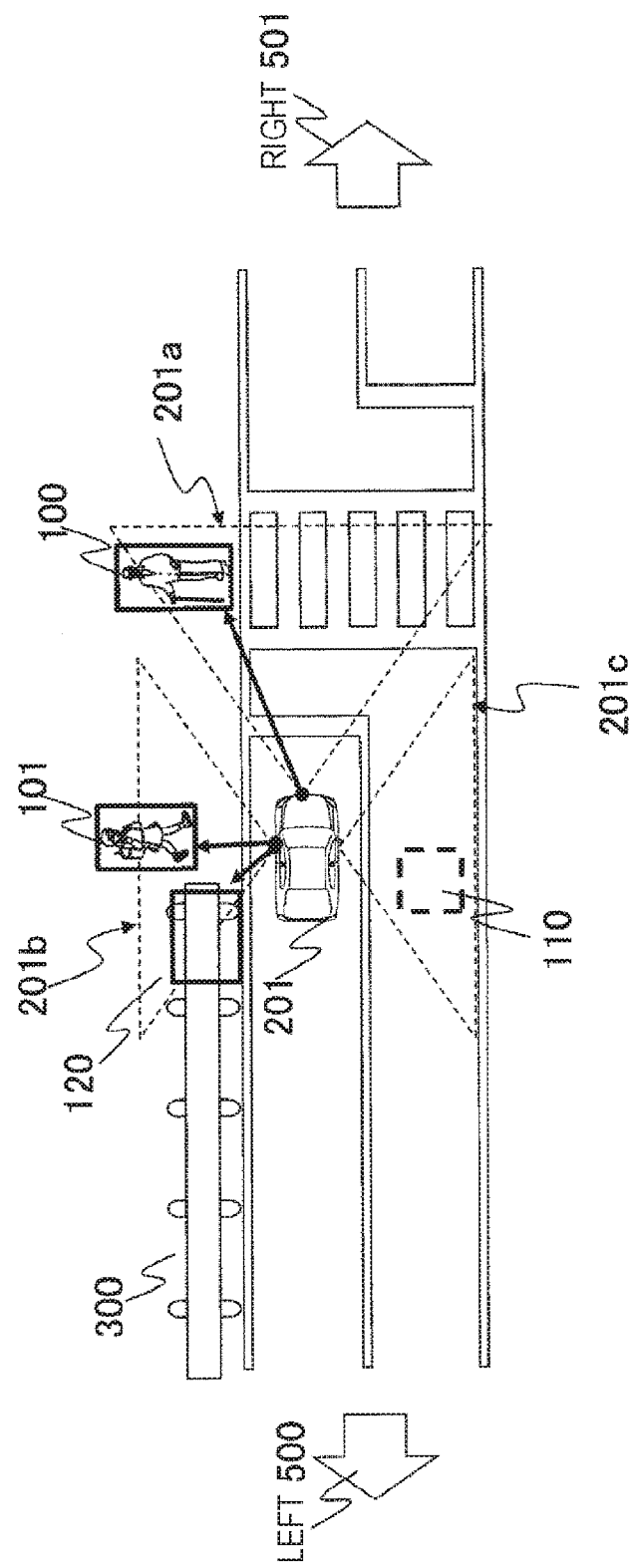
FIG. 6 is a diagram illustrating an example of the obstacle detection situation with the vehicle-mounted external sensor.
Figure 7:
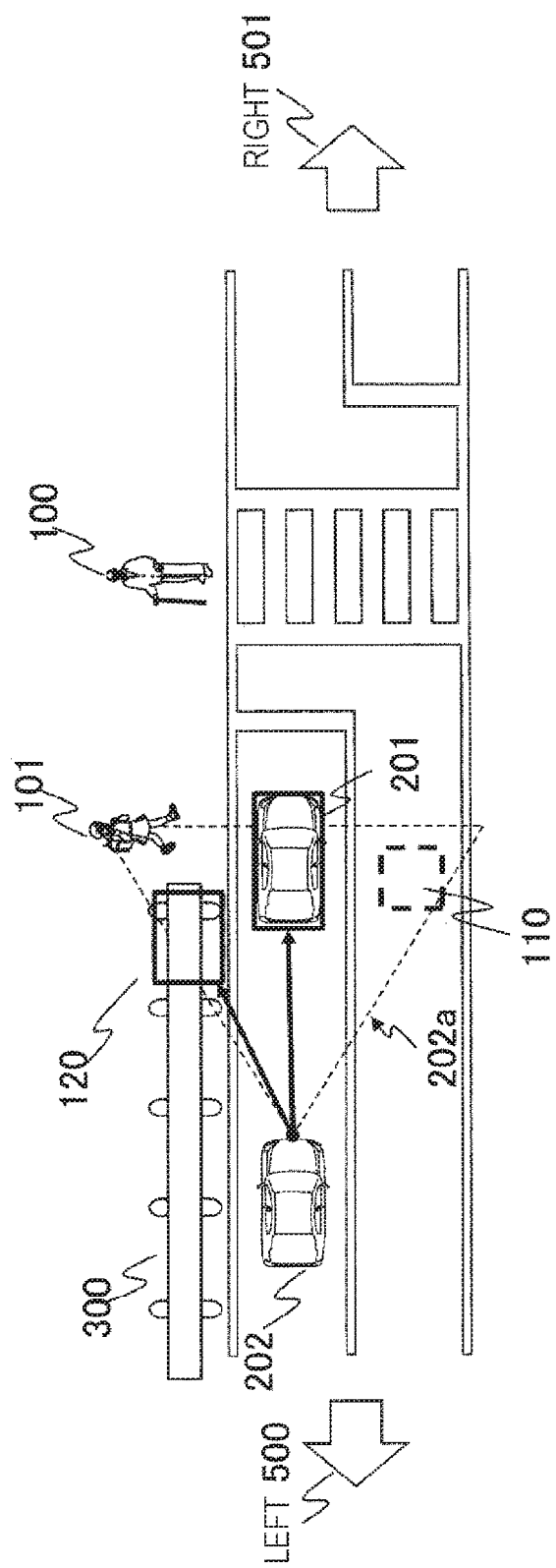
FIG. 7 is a diagram illustrating an example of the obstacle detection situation with the vehicle-mounted external sensor.
Figure 8:
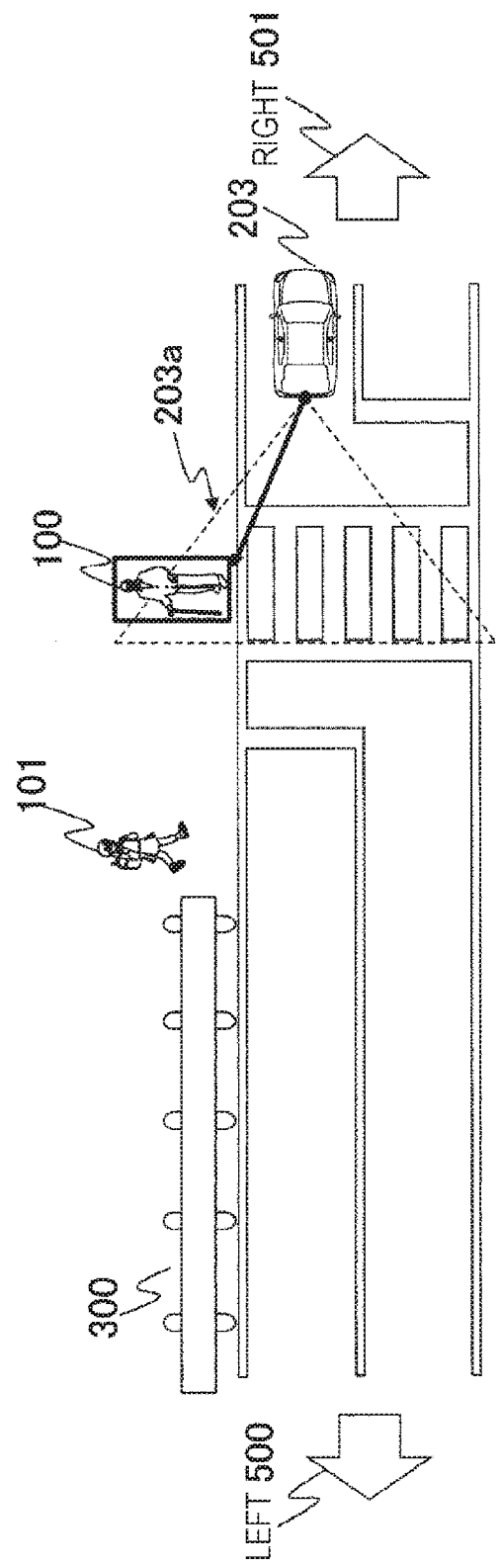
FIG. 8 is a diagram illustrating an example of the obstacle detection situation with the vehicle-mounted external sensor.

First, in a process S100, the obstacle detecting unit 20 acquires obstacle information such as a relative position, a relative speed, and a size of an obstacle at the periphery of the host vehicle. FIG. 5 illustrates an obstacle detection situation in the vehicle 200. As illustrated in the drawing, the external sensor 21, which is mounted in the vehicle 200, detects two obstacles, that is, a pedestrian 100 and an obstacle 110. Furthermore, the obstacle 110 is an erroneously detected obstacle. Similarly, FIG. 6 illustrates an obstacle detection situation in the vehicle 201. The external sensor 21, which is mounted in the vehicle 201, detects three obstacles, that is, the pedestrian 100, the pedestrian 101, and a feature 120 corresponding to an end of the guardrail 300. FIG. 7 illustrates an obstacle detection situation in the vehicle 202. The external sensor 21, which is mounted in the vehicle 202, detects two obstacles, that is, the vehicle 201 and the feature 120. Finally, FIG. 8 illustrates an obstacle detection situation in the vehicle 203. The external sensor 21, which is mounted in the vehicle 203, detects one obstacle, that is, the pedestrian 100.

In a process S200, the host vehicle position detecting unit 30 acquires position information and posture of the host vehicle based on an acquired output of the internal sensor 31.

In a process S300, the communication data processing unit 51 transmits the obstacle information that is acquired in the process S1, the position information and the posture information, which are acquired in the process S2, of the host vehicle, and the external sensor specification information that pertains to the external sensor 21 and is stored in the external sensor specification database 90 to other vehicles through the transceiver 51 and the antenna 53.

In a process S400, the map information acquiring unit 40 acquires map information, in which an arrangement, a height, and a size of the feature at the periphery of the host vehicle are stored, from the map database 41 based on the position, which is acquired in the process S200, of the host vehicle.

In a process S500, the communication data processing unit 51 receives and acquires the obstacle information transmitted from respective vehicles which are the other vehicles, the position information and the posture information of the vehicle, and the external sensor specification information pertaining to the external sensor 21 that is mounted in the respective vehicles through the transceiver 51 and the antenna 53.

From a result of the above-described processes, there are provided detection results of the respective vehicles with respect to the entirety of obstacles detected by the external sensors which are respectively mounted in a plurality of vehicles including the host vehicle and the other vehicles. In a process S550, the detection possibility determining unit 60 decides the obstacle detection results. An obstacle detection result list in FIG. 10 collectively illustrates obstacle detection results in the vehicle 202 under the obstacle detection situations illustrated in FIG. 5 to FIG. 8 in the example of the vehicle travel scene illustrated in FIG. 4. FIG. 10 illustrates the detection results by the external sensors mounted in the respective four vehicles 200, 201, 202, and 203 in a list type with respect to the entirety of obstacles detected by the external sensors which are respectively mounted in the four vehicles 200, 201, 202, and 203. Obstacles, which are exemplified in the list, include the pedestrians 100 and 101, the erroneously detected obstacle 110, the feature 120 corresponding to the end of the guardrail 300, and the vehicle 201. "Detected" described in the list represents a detection result in which an obstacle is detected with an external sensor mounted in a vehicle, and "not-detected" described in the list represents a detection result in which the obstacle is not detected with the external sensor that is mounted in the vehicle. Furthermore, whether or not obstacles, which are respectively detected by the external sensors mounted in partial vehicles among the four vehicles 200, 201, 202, and 203, are the same as each other or different from each other may be determined by calculating an absolute position and an absolute speed of each of the vehicles by the detection possibility determining unit 60 in a process S550 based on the position information and the obstacle information which are acquired from the vehicles in the processes S100, S200, and S500 and by performing a grouping process of the obstacles by using clustering and the like. When a detection result with a high detection error is obtained, the obstacles, which are detected by the external sensors mounted in the partial vehicles among the four vehicles 200, 201, 202, and 203, are determined as obstacles different from each other. In this manner, it is possible to enhance accuracy of the obstacle information. Furthermore, in this embodiment, it is assumed that an error included in obstacle detection results is regarded to be small for simplification of explanation.

Figure 9:
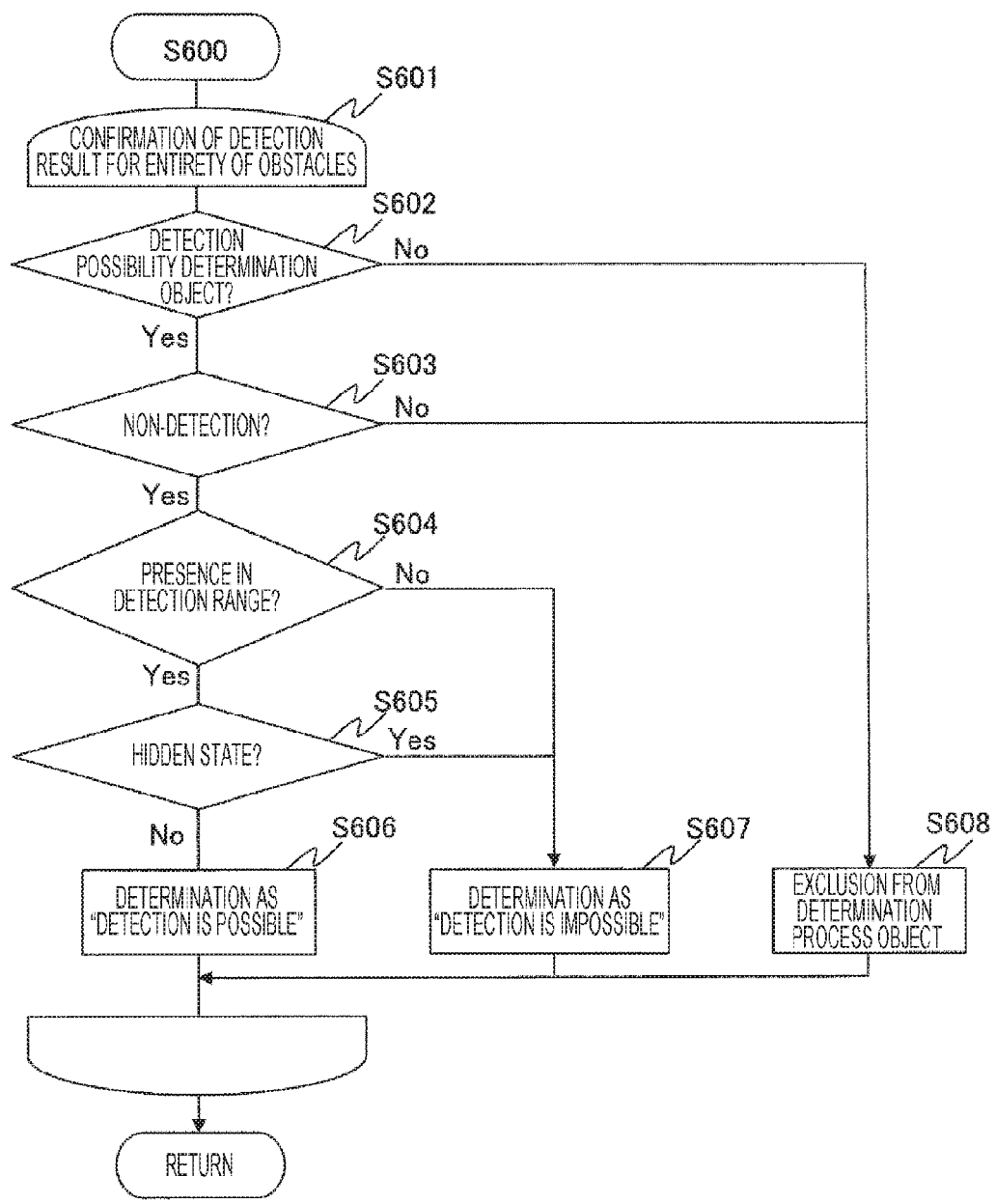
FIG. 9 is a flowchart illustrating details of an obstacle detection possibility determining process of determining whether or not an obstacle can be detected in principle.

In a process S600, in a situation in which an obstacle detected by an external sensor mounted in arbitrary vehicle cannot be detected by an external sensor mounted in other vehicles, the detection possibility determining unit 60 makes a determination on whether or not the external sensor mounted in the other vehicles can detect the obstacle in principle. FIG. 9 illustrates a flowchart of the obstacle detection possibility determining process.

In a process S601, the detection possibility determining unit 60 confirms detection results in respective vehicles with respect to the entirety of obstacles detected by the external sensors which are respectively mounted on the plurality of vehicles including the host vehicle and the other vehicles as illustrated in FIG. 10. FIG. 10 illustrates an example of detection results in each of the host vehicle 202 and the other vehicles 200, 201, and 203. As illustrated in FIG. 10, the external sensor 21 mounted in the other vehicle 200 detect the pedestrian 100 and the obstacle 110, and does not detect the pedestrian 101, the feature 120, and the vehicle 201. The external sensor 21 mounted in the other vehicle 201 detects the pedestrian 100, the pedestrian 101, and the feature 120, and does not detects the obstacle 110 and the vehicle 201. The external sensor 21 mounted in the host vehicle 202 detects the feature 120 and the vehicle 201, and does not detect the pedestrian 100, the pedestrian 101, and the obstacle 110. The external sensor 21 mounted in the other vehicle 203 detects the pedestrian 100, and does not detect the pedestrian 101, the obstacle 110, the feature 120, and the vehicle 201.

Through a process S602, when an obstacle, which is to be subjected to the detection possibility determination by the detection possibility determining unit 60, is limited to a movable object such as a pedestrian and a vehicle, and an object not provided with the obstacle-information-managing device 10, it is possible to reduce process load. For example, in a case where the detection possibility determining unit 60 compares an absolute position of an obstacle and map information and determines the obstacle is a feature, the obstacle is excluded from the detection possibility determination object, in the process S608. In addition, in a case where the detection possibility determining unit 60 determines that an obstacle is a vehicle provided with the obstacle-information-managing device 10 based on position information of other vehicles and position information of the obstacle which are obtained by the communication data processing unit 51, in the process S608, the obstacle excluded from the detection possibility determination object. Among five obstacles exemplified in the list illustrated in FIG. 10, the feature 120 and the vehicle 201 provided with the obstacle-information-managing device 10 are determined as obstacles excluded from the detection possibility determination object, and the pedestrians 100 and 101, and the erroneously detected obstacle 110 are determined as obstacles of the detection possibility determination object. However, among the pedestrians 100 and 101, and the obstacle 110, a detected obstacle is determined as an obstacle excluded from the detection possibility determination object.

In a process S603, with respect to the pedestrians 100 and 101, and the obstacle 110 which are determined as obstacles of the detection possibility determination object in the process S602, the detection possibility determining unit 60 extracts a combination of a vehicle and an obstacle which corresponds to a column that is described as "not-detected" in the list of FIG. 10. Description will be given of an example of an obstacle detection possibility determining process with respect to respective combinations of the vehicle 202 that is the host vehicle, the pedestrians 100 and 101 as obstacles, and the obstacle 110 with reference to FIG. 11.

Figure 11:
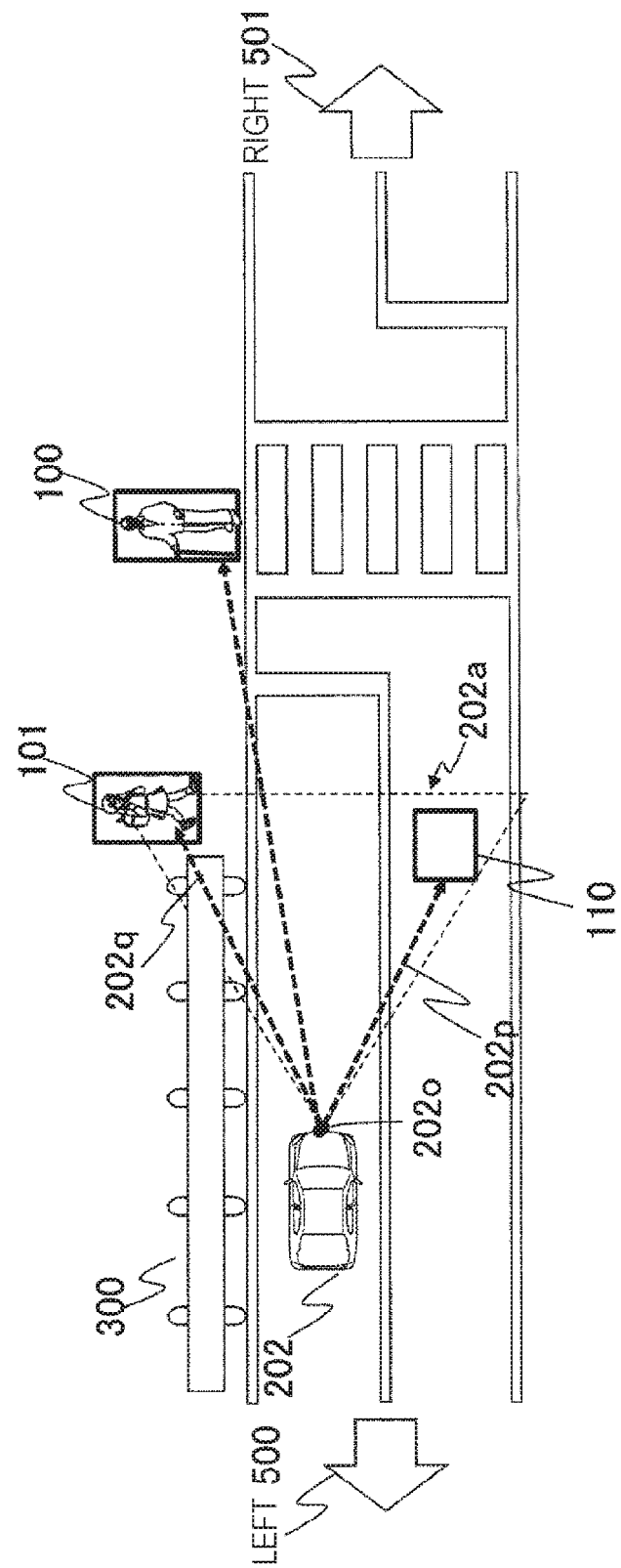
FIG. 11 is a diagram illustrating an example of the obstacle detection possibility determining process of determining whether or not an obstacle can be detected in principle with the vehicle-mounted external sensor.

In a process S604, the detection possibility determining unit 60 makes a determination on whether or not the pedestrians 100 and 101 which are obstacles and the obstacle 110 are respectively present in a detection range of an external sensor mounted in the vehicle 202 based on respective absolute positions of the pedestrians 100 and 101 which are obstacles, and the obstacle 110. In a case where a plurality of the external sensors are mounted in the vehicle 202, the detection possibility determining unit 60 may make a determination on whether or not the pedestrians 100 and 101 which are obstacles and the obstacle 110 are respectively presents in the detection range of any one of the external sensors. FIG. 11 illustrates an example of an obstacle detection possibility determining process with the external sensor 21 mounted in the vehicle 202 under the obstacle detection situations illustrated in FIG. 5 to FIG. 8 in the example of the vehicle travel scene illustrated in FIG. 4. In the example illustrated in FIG. 11, it is determined that the pedestrian 101 that is an obstacle and the obstacle 110 that is erroneously detected by the other vehicles are present in the detection region 202*a* of the external sensor mounted in the vehicle 202 that is the host vehicle. The pedestrian 100 that is an obstacle is not present in the detection region 202*a*, and thus the pedestrian 100 that is an obstacle is determined as "detection is impossible possible" by the detection possibility determining unit 60 in the process S607. Similarly, the detection possibility determining unit 60 of the obstacle-information-managing device 10 mounted in the vehicle 202 that is the host vehicle makes a determination on whether or not each obstacle is present in a detection range of the external sensors mounted in the other vehicles based on information of the other vehicles which is obtained by the communication data processing unit 51 in the process S500, and in a case where the obstacle is present, a process of determining the obstacle as "detection is impossible" is executed in the process S604 and the process S607.

In a process S605, the detection possibility determining unit 60 makes a determination on whether or not the obstacle, which is determined to be present in the detection range in the process S604, is in a state of being hidden by a feature or other obstacles based on the map information. With regard to the determination process in the process S605, description will be given of a determination process that is executed with respect to an obstacle that is not detected even though the obstacle is included in the detection range of the external sensor mounted in the host vehicle with reference to FIG. 11.

The detection possibility determining unit 60 of the obstacle-information-managing device 10, which is mounted in the vehicle 202 that is a host vehicle, calculates an absolute position 202*o*, at which the external sensor 21 is installed, based on the external sensor specification information and the position information of the host vehicle which is acquired in the process S200.

The detection possibility determining unit 60 makes a determination on whether or not a feature is present on visual lines 202*p* and 202*q* of the external sensor with respect to the pedestrian 101 that is an obstacle, and the obstacle 110 that is erroneously detected by the other vehicles based on the map information. As illustrated in FIG. 11, since the guardrail 300 that is a feature is present on the visual line 202*q*, the detection possibility determining unit 60 determines that the pedestrian 101 that is an obstacle is in a hidden state. Since a feature is not present on the visual line 202*p*, the detection possibility determining unit 60 determines that the obstacle 110 is not in the hidden state. Accordingly, the detection possibility determining unit 60 determines the pedestrian 101 that is an obstacle as "detection is impossible" in the process S607, and determines the obstacle 110 as "detection is possible" in the process S606.

Hereinbefore, with regard to the determination process performed in the process S605, description has been given of the determination process that is executed with respect to the obstacle that is not detected even though being included in the detection range of the external sensor mounted in the host vehicle with reference to FIG. 11. Similarly, the detection possibility determining unit 60 of the obstacle-information-managing device 10, which is mounted in the vehicle 202 that is the host vehicle, executes a determination process, which is executed with respect to the obstacle that is not detected even when being included in the detection range of the external sensor mounted in the other vehicles, based on the information of the other vehicles which is acquired in the process S500 by the communication data processing unit 51 in the process S605, the process S606, and the process S607. After termination of the obstacle detection possibility determining process as illustrated in detail in FIG. 9, that is, after termination of the process S600 illustrated in FIG. 3, an obstacle detection possibility determination result illustrated in FIG. 12 is obtained. In an example illustrated in FIG. 12, since the pedestrian 100 and the obstacle 110 are detected by the external sensor 21 mounted in the vehicle 200 as illustrated in FIG. 10, the pedestrian 100 and the obstacle 110 are excluded from the detection possibility determination object pertaining to the vehicle 200. The pedestrian 101 is not detected by the external sensor 21 mounted in the vehicle 200, and from the detection possibility determination result with respect to the vehicle 200, the pedestrian 101 is determined as "detection is impossible". Since the pedestrian 100 and the pedestrian 101 are detected by the external sensor 21 mounted in the vehicle 201, the pedestrian 100 and the pedestrian 101 are excluded from the detection possibility determination object pertaining to the vehicle 201. The obstacle 110 is not detected by the external sensor 21 mounted in the vehicle 201, and from the detection possibility determination result pertaining to the vehicle 201, the obstacle 110 is determined as "detection is possible". The pedestrian 100, the pedestrian 101, and the obstacle 110 are not detected by the external sensor 21 mounted in the vehicle 202, and from the detection possibility determination result pertaining to the vehicle 202, the pedestrian 100 and the pedestrian 101 are determined as "detection is impossible", and the obstacle 110 is determined as "detection is possible". Since the pedestrian 100 is detected by the external sensor 21 mounted in the vehicle 203, and the pedestrian 100 is excluded from the detection possibility determination object pertaining to the vehicle 203. The pedestrian 101 and the obstacle 110 are not detected by the external sensor 21 mounted in the vehicle 203, and from the detection possibility determination result pertaining to the vehicle 203, the pedestrian 101 and the obstacle 110 are determined as "detection is impossible". The feature 120 and the vehicle 201 are excluded from the detection possibility determination object pertaining to the entirety of vehicles 200, 201, 202, and 203. Furthermore, the communication data processing unit 51 of the obstacle-information-managing device 10 mounted in the host vehicle may notify the other vehicles of the obstacle detection possibility determination result obtained as described above.

In a step S700, the obstacle presence determining unit 70 makes a determination as to presence of the entirety of obstacles included in the obstacle information that is acquired from the entirety of vehicles based on the obstacle information obtained in the processes S100 and S500, and the obstacle detection possibility information obtained from the result of obstacle detection possibility determination that is executed in the process S600 by the detection possibility determining unit 60. At this time, the obstacle presence determining unit 70 may calculate a degree of accuracy of the obstacle presence determining process result. Under the obstacle detection situation illustrated in FIG. 5 to FIG. 8 in the example of the vehicle travel scene illustrated in FIG. 4, the obstacle presence determining unit 70 of the obstacle-information-managing device 10 mounted in the vehicle 202 that is the host vehicle obtains an obstacle presence determining process result and a calculation result of the degree of accuracy which are illustrated in FIG. 13 based on the content of the obstacle detection result list illustrated in FIG. 10 and the contents of the obstacle detection possibility determination result list illustrated in FIG. 12.

FIG. 13 illustrates a list of the obstacle presence determining process result and the calculation result of the degree of accuracy which are obtained by the obstacle presence determining unit 70. With regard to determination on presence of the pedestrian 100 that is an obstacle, as illustrated in FIG. 10, the number of vehicles which detect the pedestrian 100, that is, the number of detection is 3, and the number of vehicles which do not detect the pedestrian 100, that is, the number of non-detection is 1. However, since the detection possibility determination result of the pedestrian 100 with respect to the vehicle 202 that does not detect the pedestrian 100 is "detection is impossible" in FIG. 12, the number of non-detection is not used in a majority decision process. Accordingly, the number of parameters in the majority decision is 3, the number of detection is 3, and the number of non-detection which is used in the majority decision is 0. From the result of the majority decision process, the number of detection of 3 is greater than the number of non-detection of 0, and thus the pedestrian 100 that is an obstacle is determined to be present. Accordingly, the degree of accuracy, which is a ratio of the number of detection of 3 (a greater side between the number of detection of 3 and the number of non-detection of 0) to the number of parameters of 3 in the majority decision, becomes 1 (=3/3). Similarly, with regard to determination on presence of the pedestrian 101 that is an obstacle, the number of detection is 1, the number of non-detection is 3, and "detection is impossible" is determined in FIG. 12 with respect to any one of three results of "not-detected" in FIG. 10. Accordingly, the number of parameters in the major decision becomes 1, the number of detection becomes 1, and the number of non-detection which is used in the majority decision becomes 0. Since the number of parameters in the majority decision becomes 1, and thus the majority decision process is not established, and the pedestrian 101 that is an obstacle is determined to be present. As a result, the degree of accuracy becomes N/A. With regard to presence of the obstacle 110 that is erroneously detected by the vehicle 200, the number of detection is 1, the number of non-detection is 3, the number of determination of "detection is impossible" in FIG. 12 with respect to the three results of "not-detected" in FIG. 10 is 1, and the number of determination of "detection is possible" is 2. As a result, the number of parameters in the majority decision becomes 3, the number of detection becomes 1, and the number of non-detection which is used in the majority decision becomes 2. From the majority decision process result, the number of non-detection of 2 is greater than the number of detection of 1, and thus the obstacle 110 is determined not to be present. As a result, the degree of accuracy, which is a ratio of the number of non-detection of 2 (a greater side between the number of detection of 1 and the number of non-detection of 2) to the number of parameters of 3 in the majority decision, becomes ⅔.

The feature 120 and the vehicle 201, which are obstacles, are determined as a feature and a vehicle in which the obstacle-information-managing device 10 is mounted, and thus the above-described majority decision process is not performed. The obstacle presence determining unit 70 determines that the feature 120 and the vehicle 201, which are obstacles, are present, and sets the degree of accuracy to 1.

In a process S800, the obstacle presence determining unit 70 transmits the obstacle presence determining process result obtained in the process S700 to the vehicle control device 80. In the case of calculating the degree of accuracy in the process S700, the obstacle presence determining unit 70 may transmit the obstacle presence determining process result and the calculation result of the degree of accuracy to the vehicle control device 80. The vehicle control device 80 outputs an alarm to a driver to perform deceleration control based on the received obstacle presence determining process result, and thus it is possible to prevent or reduce a damage of collision accidence. When receiving the obstacle presence determining process result indicating "obstacle is present" and the calculation result of the degree of accuracy, the vehicle control device 80 may set a control gain to a high side so as to enhance an operation response of a break actuator with respect to a deceleration command when the degree of accuracy is high. When the degree of accuracy is low, for example, the vehicle control device 80 retard alarm output timing to a driver, or may suppress the alarm output.

The obstacle-information-managing device 10 of this embodiment may attain the following operational effect.

(1) The obstacle-information-managing device 10 includes the obstacle detecting unit 20, the communication data processing unit 51, and the detection possibility determining unit 60. The obstacle detecting unit 20 acquires obstacle information pertaining to the pedestrians 100 and 101 which are detected as obstacles at the periphery of the host vehicle with the external sensor 21 mounted in the vehicle 202 that is the host vehicle, the obstacle 110 that is erroneously detected, the feature 120 corresponding to an end of the guardrail 300, and the vehicle 201 in which the obstacle-information-managing device 10 is mounted. The communication data processing unit 51 acquires obstacle information pertaining to the pedestrians 100 and 101, the obstacle 110, the feature 120, and the vehicle 201, which are detected with the external sensors 21 which are respectively mounted in the vehicles 200, 201, and 203 other than the vehicle 202 that is the host vehicle among the plurality of vehicles 200, 201, 202, and 203, as obstacles at the periphery of the respective vehicles. In a case where the obstacle 110 included in the obstacle information is detected with the external sensor 21 mounted in, for example, the vehicle 200 among the plurality of vehicles 200, 201, 202, and 203, and the obstacle 110 is not detected with the external sensor 21 mounted in each of the remaining vehicles 201, 202, and 203 other than the vehicle 200 among the plurality of vehicles 200, 201, 202 and 203, The detection possibility determining unit 60 acquires obstacle detection possibility information as to whether or not the obstacle 110 can be detected in principle with the external sensor 21 that is mounted in each of the remaining vehicles 201, 202, and 203. The obstacle presence determining unit. 70 determines the presence of the obstacle 110 based on the obstacle detection possibility information illustrated in FIG. 12, and the obstacle information illustrated in FIG. 10. Accordingly, it is possible to determine the presence of the obstacle with high accuracy.

(2) The obstacle detection possibility information illustrated in FIG. 12 indicates that the obstacle 110, which is detected with the external sensor 21 mounted in the vehicle 200 among the plurality of vehicles 200, 201, 202, and 203, can be detected in principle with the eternal sensor 21 that is mounted in each of the vehicles 201 and 202 among the plurality of vehicles 200, 201, 202, and 203. The obstacle detection possibility information illustrated in FIG. 12 indicates that the obstacle 110, which is detected with the external sensor 21 that is mounted in the vehicle 200 among the plurality of vehicles 200, 201, 202, and 203, cannot be detected in principle with the external sensor 21 mounted in the vehicle 203 among the plurality of vehicles 200, 201, 202, and 203. In this case, the obstacle presence determining unit 70 determines the presence of the obstacle 110 based on the obstacle information pertaining to the obstacle detected with the external sensor 21 that is mounted in each of the vehicles 201 and 202 not based on the obstacle information pertaining to the obstacle that is detected with the external sensor 21 mounted in the vehicle 203.

In addition, for example, in a case where an obstacle, which is detected with the external sensor 21 mounted in each of two vehicles among a total of five vehicles, is not detected with the external sensor 21 mounted in each of the three remaining vehicles among the five vehicles, when the obstacle cannot be detected in principle with the external sensor 21 mounted in each of the two vehicles among the three remaining vehicles, and the obstacle can be detected in principle with the external sensor 21 mounted in one vehicle among the three remaining vehicles, the obstacle presence determining unit 70 determines the presence of the obstacle based on the obstacle information acquired from the one vehicle in which the external sensor 21 that can detect the obstacle in principle is mounted, and the obstacle information acquired from the two vehicles in which the external sensor 21 that detects the obstacle not based on the obstacle information acquired from the two vehicles in which the external sensor 21 that cannot detect the obstacle in principle is mounted. Accordingly, even though an obstacle, which is detected with an external sensor mounted in an arbitrary vehicle, cannot be detected in principle with an external sensor mounted in a separate vehicle, when the presence of the obstacle is determined based on the obstacle information detected with the external sensor mounted in the separate vehicle, the obstacle, which is originally present, may be erroneously determined not to be present. According to this embodiment, it is possible to decrease the erroneous determination.

(3) When the number of vehicles, in which the external sensor 21 that detects an obstacle is mounted, is greater than the number of vehicles in which the external sensor 21 capable of detecting the obstacle in principle is mounted among vehicles in which the external sensor 21 that does not detect the obstacle is mounted, the obstacle presence determining unit 70 determines that the obstacle is present. Among the vehicles in which the external sensor 21 that does not detect the obstacle is mounted, when the number of the vehicles in which the external sensor 21 capable of detecting the obstacle in principle is mounted is greater than the number of vehicles in which the external sensor 21 that detects the obstacle is mounted, the obstacle presence determining unit 70 determines that the obstacle is not present. Under a situation illustrated in FIG. 4 to FIG. 8, and FIG. 11, as illustrated in FIG. 10 and FIG. 12, even though the obstacle 110, which is detected with the external sensor 21 mounted in the vehicle 200, can be detected in principle with the external sensor 21 that is mounted in each of the vehicles 201 and 202, the obstacle 110 is not detected. That is, among the vehicles 201, 202, and 203 in which the external sensor 21 that does not detect the obstacle 110 is mounted, the number of the vehicles 201 and 202 in which the external sensor 21 capable of detecting the obstacle 110 in principle is mounted is greater than the number of the vehicle 200 in which the external sensor 21 that detects the obstacle 110 is mounted, and thus the obstacle presence determining unit. 70 determines that the obstacle 110 is not present. Accordingly, it is possible to remove obstacle information that is obtained through an erroneous detection by the external sensor.

(4) As illustrated in FIG. 13, when determining the presence of the pedestrian 100 or the obstacle 110, the obstacle presence determining unit 70 calculates the degree of accuracy. A total number of the vehicle 200 in which the external sensor 21 that detects the obstacle 110 is mounted, and the vehicles 201 and 202 in which the external sensor 21 capable of detecting the obstacle 110 in principle is mounted among the vehicles 201, 202, and 203 in which the external sensor 21 that does not detect the obstacle 110 is mounted is 3. Between the number of the vehicle 200 in which the external sensor 21 that detects the obstacle 110 is mounted, and the number of the vehicles 201 and 202 in which the external sensor 21 capable of detecting the obstacle 110 in principle is mounted among the vehicles 201, 202, and 203 in which the external sensor 21 that does not detect the obstacle 110 is mounted, the number of vehicles on a greater side is the same as the total number (2) of the vehicles 201 and 202 in which the external sensor 21 capable of detecting the obstacle 110 in principle is mounted among the vehicles 201, 202, and 203 in which the external sensor 21 that does not detect the obstacle 110. The degree of accuracy of the determination result, which indicates that the obstacle 110 is not present, by the obstacle presence determining unit 70 is a ratio of the number (2) of vehicles to the total number (3) of vehicles, that is, $2/3$.

As illustrated in FIG. 13, the vehicle 202, in which the external sensor 21 that does not detect the pedestrian 100 is mounted, is a vehicle in which the external sensor 21 not capable of detecting the pedestrian 100 in principle is mounted. A vehicle, in which the external sensor 21 that does not detect the pedestrian 100 even though capable of detecting the pedestrian 100 in principle is mounted, is not present. Accordingly, the degree of accuracy of the determination result, which indicates that the pedestrian 100 is present, by the obstacle presence determining unit 70 is a ratio (3/3) of the total number (3) of the vehicles 200, 201, and 203 in which the external sensor that detects the pedestrian 100 is mounted to the same total number (3) thereof, that is, 1.

(5) For example, in the vehicle 202 in which the external sensor 21 that does not detects the pedestrian 101 and the obstacle 110 is mounted, as illustrated in FIG. 11, the following condition is established with regard to the pedestrian 101. That is, the pedestrian 101 is present in the detection region 202a of the external sensor 21 mounted in the vehicle 202, and the guardrail 300 that is a blocking object is present on a straight visual line 202q connecting the position 202o of the external sensor and the position of the pedestrian 101. In this case, the detection possibility determining unit 60 determines that the pedestrian 101 cannot be detected in principle. As illustrated in FIG. 11, with regard to the obstacle 110, even though the obstacle 110 is present in the detection region 202a of the external sensor 21 that is mounted in the vehicle 202, a blocking object is not present on a straight line connecting the position 202o of the external sensor and the position of the obstacle 110. In this case, the detection possibility determining unit 60 determines that the obstacle 110 can be detected in principle. The above-described obstacle detection possibility information indicates of the detection possibility determination result determined by the detection possibility determining unit 60 as to whether or not the obstacle can be detected in principle.

(6) As described above, the communication data processing unit 51 acquires the obstacle information from the other vehicles 200, 201, and 203 other than the vehicle 202 that is the host vehicle among the plurality of vehicles 200, 201, 202, and 203. The vehicle 202 that is the host vehicle is a vehicle in which the external sensor 21 that does not detect the obstacle 110 is mounted, and thus the detection possibility determination result by the detection possibility determining unit 60 includes information indicating that the obstacle 110 is not detected. The communication data processing unit 51 may notify the other vehicles 200, 201, and 203 of the obstacle detection possibility determination result pertaining to the vehicle 202 that is the host vehicle. In this case, the detection possibility determining unit 60 of the obstacle-information-managing device 10 mounted in the host vehicle does not execute the obstacle detection possibility determining process of determining obstacle detection possibility with the external sensor that is mounted in the other vehicles, and thus it is possible to suppress an increase in processing load that is problematic in a case where a plurality of other vehicles are located at the periphery of the host vehicle.

Figure 14:
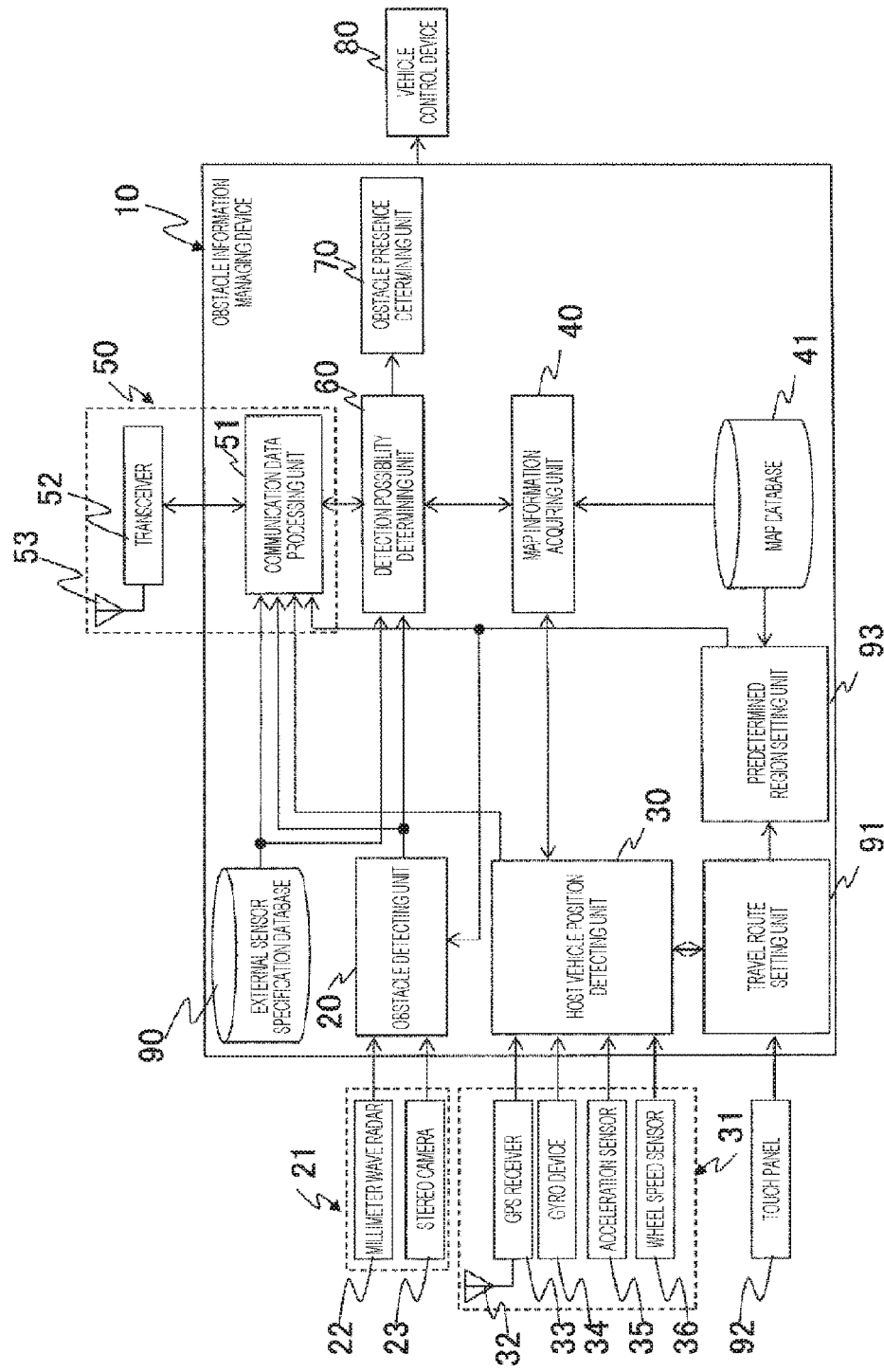
FIG. 14 is a configuration diagram of the obstacle-information-managing device.

MODIFICATION EXAMPLES (1) in a case where the communication data processing unit 51 acquires the obstacle information from the other vehicles through the transceiver 52 and the antenna 53, there is a possibility that it is difficult to acquire a plurality of pieces of information through a communication due to a restriction on a communication band. Accordingly, so as to reduce the amount of communication data, the communication data processing unit 51 may acquire only obstacle information including a detection result of an obstacle that is present in a predetermined region at the periphery of the host vehicle and the other vehicles from the other vehicles instead of acquiring obstacle information including detection results of the entirety of obstacles from the other vehicles. FIG. 14 is a configuration diagram of an obstacle-information-managing device 10 according to this modification example. Description of portions, to which reference numerals common to FIG. 14 and FIG. 1 are given, will be omitted. For example, when a driver designates a travel route to a destination by using an input unit such as a touch panel 92 illustrated in FIG. 14, a travel route setting unit 91 sets a travel route of a host vehicle. A predetermined region setting unit 93 sets a predetermined region including a location such as a cross-walk to which attention is required to be particularly given for safety in the route that is set based on the map information obtained from the map database 41, and information of the travel route that is set. The other vehicles at the periphery of the host vehicle may be notified of shape data in map coordinates of the predetermined region, which is set in this manner, by the communication unit 50. Since obstacle information, which includes an obstacle detection result obtained through detection of an obstacle that is present in the predetermined region by the external sensor mounted in the other vehicles notified of the predetermined, region, is transmitted to the host vehicle from the other vehicles, the communication data processing unit 51 of the obstacle-information-managing device 10 provided to the host vehicle receives the obstacle information. Furthermore, obstacle information, which is acquired by the obstacle detecting unit 20 of the obstacle-information-managing device 10 with the external sensor that is mounted in the host vehicle, may also be information pertaining to an obstacle that is present in the predetermined region that is set by the predetermined region setting unit 93.

Figure 15:
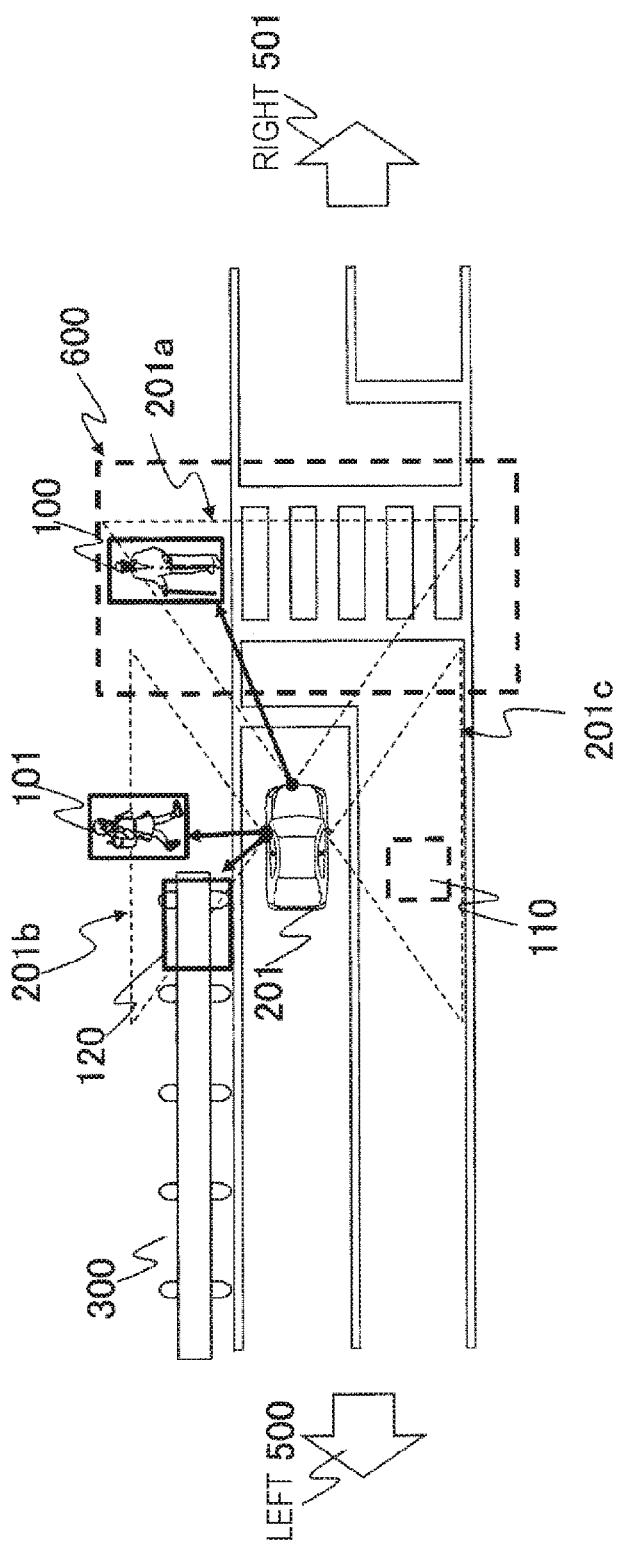
FIG. 15 is a diagram illustrating an obstacle detection situation in a predetermined region.

FIG. 15 illustrates an obstacle detection situation in the predetermined region according to this modification example. Description of portions, to which reference numerals common to FIG. 15 and FIG. 6 are given, will be omitted. For example, as illustrated in FIG. 15, it is assumed that a host vehicle (not illustrated) transmits shape data of a predetermined region 600 to the vehicle 201 that is one of the other vehicles. Among three obstacles detected by the vehicle 201, that is, the pedestrians 100 and 101, and the feature 120 corresponding to an end of the guardrail 300, presence of an obstacle present in the predetermined region 600 is determined by the communication data processing unit 51 of the obstacle-information-managing device 10 that is provided to the vehicle 201. In an example illustrated in FIG. 15, the communication data processing unit 51 of the obstacle-information-managing device 10 provided to the vehicle 201 determines that only the pedestrian 100 that is an obstacle is present in the predetermined region 600, and thus obstacle information, which includes only a detection result of the pedestrian 100 that is an obstacle, may be transmitted to the host vehicle. According to this configuration, it is possible to reduce the amount of communication data. For example, only obstacle information pertaining to an obstacle, which is present in a location such as a cross-walk with a high risk, is acquired while supporting safe driving. Accordingly, it is possible to solve a problem related to transmission delay due to an increase in the amount of communications between vehicles due to presence of a plurality of vehicles at the periphery of the host vehicle.

Figure 16:
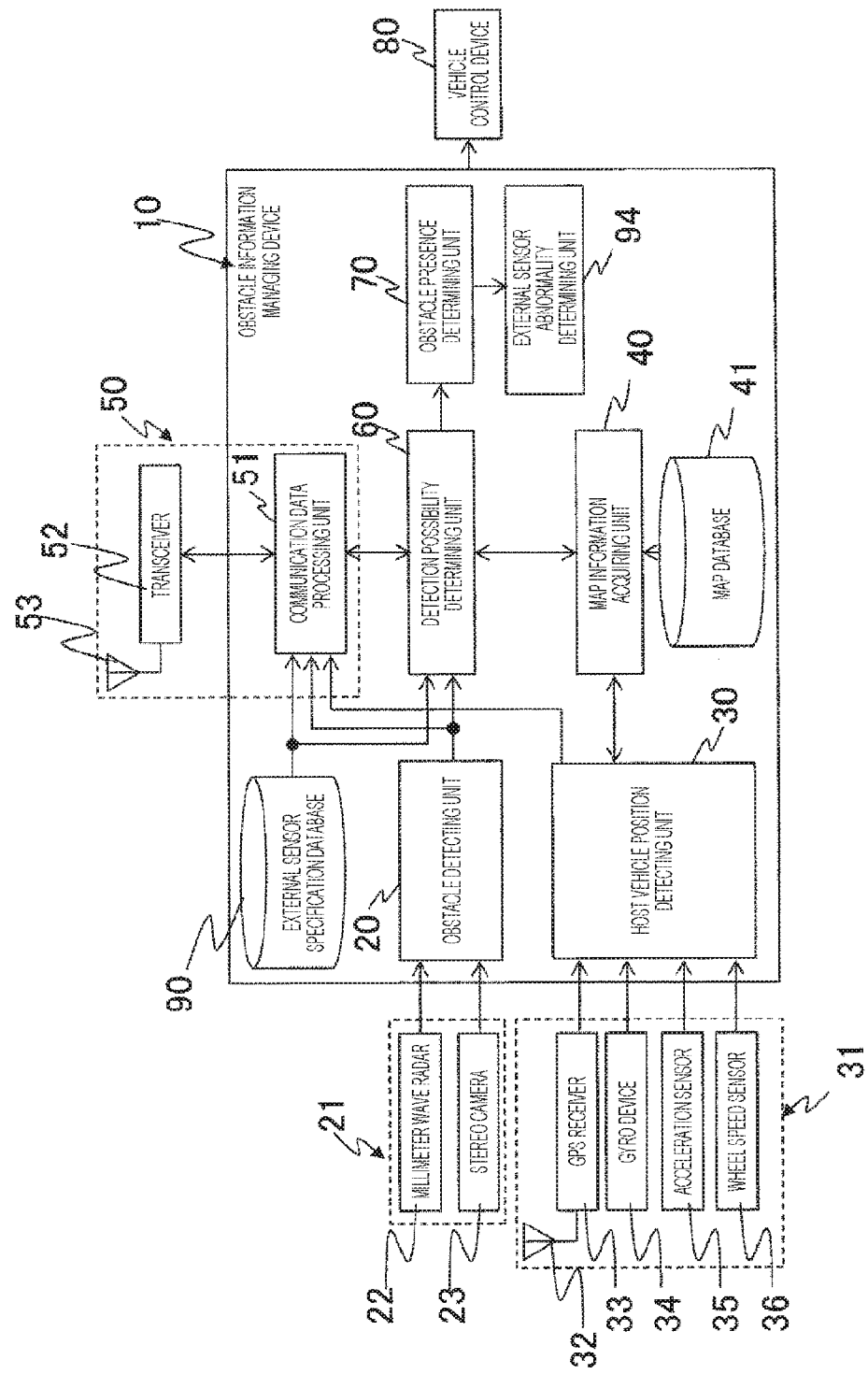
FIG. 16 is a configuration diagram of the obstacle-information-managing device.

(2) FIG. 16 is a configuration diagram of an obstacle-information-managing device 10 according to this modification example. Description of portions, to which reference numerals common to FIG. 16 and FIG. 1 are given, will be omitted. As illustrated in FIG. 16, the obstacle-information-managing device 10 may include an external sensor abnormality determining unit 94 that makes a determination on operation abnormality of the external sensor 21 that is mounted in the host vehicle based on the obstacle detection possibility determination result by the obstacle presence determining unit 70. For example, mismatching between an obstacle detected with the external sensor 21 mounted in the host vehicle, and an obstacle that is determined to be present by the obstacle presence determining unit 70 of the obstacle-information-managing device 10 provided to the host vehicle occurs in a predetermined number of times or greater, the external sensor abnormality determining unit 94 of the obstacle-information-managing device 10 provided to the host vehicle determines that abnormality occurs in the external sensor 21 mounted in the host vehicle. According to this, it is possible to determine an abnormal state of the external sensor. Since it is possible to detect an external sensor abnormal operation that is difficult to determine by the host vehicle alone, it is possible to early detect the external sensor abnormal state that is determined only during periodic inspection in the related art.

The obstacle-information-managing device according to the invention is not limited to the embodiment and the modification examples. For example, a road-side device, which has a function of detecting a moving object on a road and notifying peripheral vehicles of an obstacle detection result, and is installed along the road, may share the obstacle information and the obstacle detection possibility information. In this case, parts or the entirety of units mounted in the obstacle-information-managing device 10 are mounted in the road-side device.

The obstacle presence determining process result obtained by the obstacle presence determining unit 70 of the obstacle-information-managing device 10 according to the invention may be transmitted to a portable information terminal of a pedestrian, or a vehicle having only a communication unit. When an obstacle presence determining process result with a high degree of accuracy is transmitted, it is possible to realize a support such as accurate notification for approaching of a vehicle to the pedestrian.

REFERENCE SIGNS LIST 10 obstacle-information-managing device
20 obstacle detecting unit
21 external sensor
22 millimeter wave radar
23 stereo camera
30 host vehicle position detecting unit
31 internal sensor
32 GSP antenna
33 GPS receiver
34 gyro sensor
35 acceleration sensor
36 wheel speed sensor
40 map information acquiring unit
41 map database
50 communication unit
51 communication data processing unit
52 transceiver
53 antenna
60 detection possibility determining unit
70 obstacle presence determining unit
80 vehicle control device
90 external sensor specification database
91 travel route setting unit
92 touch panel
93 external sensor abnormality determining unit
100, 101 pedestrian
110 obstacle
200, 201, 202, 203, 250 vehicle
200a detection range of external sensor that is mounted in vehicle 200
201a, 201b, 201c detection range of external sensor that is mounted in vehicle 201
202a detection range of external sensor that is mounted in vehicle 202
202o installation position external sensor that is mounted in vehicle 202
202p visual line of external sensor that is mounted in vehicle 202 with respect to obstacle 110
203a detection range of external sensor that is mounted in vehicle 203
250x K-axis of vehicle coordinate system in vehicle 250
250y Y-axis of vehicle coordinate system in vehicle 250
250z Z-axis of vehicle coordinate system in vehicle 250
250o installation position of external sensor that is mounted in vehicle 250
250a detection range of external sensor that is mounted in vehicle 250
250b horizontal sensing angle of external sensor that is mounted in vehicle 250
250c vertical sensing angle of external sensor that is mounted in vehicle 250
250d detection distance of external sensor that is mounted in vehicle 250
300 guardrail
310 travel road surface of vehicle 250
500 left direction of travel lane
501 right direction of travel lane
600 predetermined region

The invention claimed is:

1. An obstacle-information-managing device, comprising:
an obstacle information acquiring unit that acquires obstacle information pertaining to an obstacle, which is detected by an external sensor mounted in each of a plurality of vehicles including a host vehicle, at the periphery of the vehicle;
an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles; and
an obstacle presence determining unit that determines the presence of the at least one obstacle based on the obstacle detection possibility information and the obstacle information;
wherein the remaining vehicles include a first vehicle and a second vehicle, and when the obstacle detection possibility information indicates that the at least one obstacle is capable of being detected in principle with the external sensor that is mounted in the first vehicle, and the at least one obstacle is not capable of being detected in principle with the external sensor that is mounted in the second vehicle, the obstacle presence determining unit determines the presence of the at least one obstacle based on the obstacle information pertaining to the at least one obstacle detected with the external sensor that is mounted in the first vehicle, and the obstacle information pertaining to the at least one obstacle detected by the external sensor that is mounted in the at least one vehicle not based on the obstacle information pertaining to the at least one obstacle detected with the external sensor that is mounted in the second vehicle.

2. The obstacle-information-managing device according to claim 1,
wherein the obstacle presence determining unit determines that the at least one obstacle is present when the at least one vehicle includes a great number of vehicles in comparison to the first vehicle, and the obstacle presence determining unit determines that the at least one obstacle is not present when the first vehicle includes a great number of vehicles in comparison to the at least one vehicle.

3. The obstacle-information-managing device according to claim 2,
wherein the obstacle presence determining unit calculates a degree of accuracy when determining the presence of the at least one obstacle, and
the degree of accuracy is a ratio of the number of vehicles on a greater side between the number of the at least one vehicle and the number of the first vehicle to a total number of the at least one vehicle and the first vehicle.

4. An obstacle-information-managing device, comprising:
an obstacle information acquiring unit that acquires obstacle information pertaining to an obstacle, which is detected by an external sensor mounted in each of a plurality of vehicles including a host vehicle, at the periphery of the vehicle;
an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles;
an obstacle presence determining unit that determines the presence of the at least one obstacle based on the obstacle detection possibility information and the obstacle information; and
an obstacle detection possibility determining unit that determines that the at least one obstacle is not capable of being detected in principle, in a case where a first condition, in which the at least one obstacle is not present in a detection range of the external sensor that is mounted in each of the remaining vehicles, is established with respect to each of the remaining vehicles, or in a case where a second condition, in which the at least one obstacle is present in the detection range of the external sensor that is mounted in each of the remaining vehicles, and a blocking object is present on a straight line connecting a position of the external sensor and a position of the at least one obstacle, is established, and determines that the at least one obstacle is capable of being detected in principle in a case where the first condition and the second condition are not established,
wherein the obstacle detection possibility information indicates a determination result of the obstacle detection possibility determining unit.

5. The obstacle-information-managing device according to claim 4, further comprising:
a communication unit that receives the obstacle information from other vehicles except for the host vehicle among the plurality of vehicles, and notifies the other vehicles of the determination result, which pertains to the host vehicle, by the obstacle detection possibility determining unit when the host vehicle is included in the remaining vehicles.

6. The obstacle-information-managing device according to claim 4,
wherein the obstacle information acquiring unit acquires the obstacle information pertaining to an obstacle that is present in a predetermined region at the periphery of the plurality of vehicles with the external sensor that is mounted in the host vehicle, and notifies the other vehicles of the predetermined region to acquire the obstacle information with the external sensor that is mounted in the other vehicles.

7. An obstacle-information-managing device, comprising:
an obstacle information acquiring unit that acquires obstacle information pertaining to an obstacle, which is detected by an external sensor mounted in each of a plurality of vehicles including a host vehicle, at the periphery of the vehicle;
an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles;
an obstacle presence determining unit that determines the presence of the at least one obstacle based on the obstacle detection possibility information and the obstacle information; and
an external sensor abnormality determining unit that determines that abnormality occurs in the external sensor mounted in the host vehicle in a case where mismatching between an obstacle determined to be present by the obstacle presence determining unit and an obstacle detected by the external sensor mounted in the host vehicle occurs in a predetermined number of times or greater.

8. An obstacle-information-managing device, comprising:
an obstacle information acquiring unit that acquires obstacle information pertaining to an obstacle, which is detected by an external sensor mounted in each of a plurality of vehicles including a host vehicle, at the periphery of the vehicle;
an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles; and an obstacle presence determining unit that determines the presence of the at least one obstacle based on the obstacle detection possibility information and the obstacle information;

wherein the at least one vehicle includes two vehicles, the at least one obstacle includes a first obstacle that is detected with the external sensor mounted in one vehicle between the two vehicles, and a second obstacle that is detected with the external sensor mounted in the other vehicle between the two vehicles, and the obstacle detection possibility information acquiring unit performs a grouping process based on a position and a velocity of the first obstacle and the second obstacle to determine whether or not the first obstacle and the second obstacle are the same as each other or different from each other.

* * * * *